US012610014B2

(12) United States Patent
Niina et al.

(10) Patent No.: US 12,610,014 B2
(45) Date of Patent: Apr. 21, 2026

(54) IMAGE PROCESSING APPARATUS WITH PREDICTIVE TIME DISPLAY AND INTERACTIVE CONFIGURATION

(71) Applicant: FUJIFILM Business Innovation Corp., Tokyo (JP)

(72) Inventors: Hiroshi Niina, Kanagawa (JP); Tetsuya Wakiyama, Kanagawa (JP); Kiyotaka Tsuchibuchi, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 523 days.

(21) Appl. No.: 17/862,807

(22) Filed: Jul. 12, 2022

(65) Prior Publication Data

US 2023/0300260 A1     Sep. 21, 2023

(30) Foreign Application Priority Data

Mar. 16, 2022    (JP) ................................. 2022-041593

(51) Int. Cl.
*H04N 1/00*              (2006.01)
(52) U.S. Cl.
CPC ..... *H04N 1/00068* (2013.01); *H04N 1/00082* (2013.01); *H04N 1/00427* (2013.01)
(58) Field of Classification Search
None
See application file for complete search history.

(56) References Cited

U.S. PATENT DOCUMENTS

| | | | | |
|---|---|---|---|---|
| 2002/0054333 A1* | 5/2002 | Yamamoto | ............ | G06F 3/1285 |
| | | | | 358/1.15 |
| 2004/0145660 A1* | 7/2004 | Kusaka | .................. | H04N 23/62 |
| | | | | 386/E5.072 |
| 2009/0195821 A1* | 8/2009 | Matoba | .............. | H04N 1/32512 |
| | | | | 358/1.15 |
| 2011/0317200 A1* | 12/2011 | Honda | ..................... | B41J 29/38 |
| | | | | 358/1.14 |
| 2012/0320410 A1* | 12/2012 | Kakegawa | ............ | G06F 3/1285 |
| | | | | 358/1.15 |
| 2013/0070293 A1* | 3/2013 | Takahashi | .......... | H04N 1/00973 |
| | | | | 358/1.15 |

(Continued)

FOREIGN PATENT DOCUMENTS

| | | | |
|---|---|---|---|
| JP | H07-76155 A | | 3/1995 |
| JP | 2003259057 A | * | 9/2003 |

(Continued)

OTHER PUBLICATIONS

Sasaki, JP-2003259057-A English Translation, par 0004-0006, 0012, 0014-0020, 0024 (Year: 2003).*

(Continued)

*Primary Examiner* — Miya J Cato
(74) *Attorney, Agent, or Firm* — Oliff PLC

(57) ABSTRACT

An image processing apparatus includes a processor configured to: estimate, for image information to undergo image processing, a first time in performing the image processing on the image information in accordance with a current setting for the image processing; and present, to a user, the first time, a candidate setting changeable from the current setting, and a second time in performing the image processing on the image information in accordance with the candidate setting.

21 Claims, 10 Drawing Sheets

(56) References Cited

U.S. PATENT DOCUMENTS

2019/0199886 A1* 6/2019 Iwai ...................... G06F 21/608

FOREIGN PATENT DOCUMENTS

| | | | | |
|----|------------|---|---|--------|
| JP | 2006256269 | A | * | 9/2006 |
| JP | 2010-079611 | A | | 4/2010 |
| JP | 2013-014099 | A | | 1/2013 |
| JP | 2017-059940 | A | | 3/2017 |

OTHER PUBLICATIONS

Oct. 28, 2025 Office Action issued in Japanese Patent Application No. 2022-041593.

* cited by examiner

| | Name | Processing | Estimated end time |
|---|---|---|---|
| ☐ | Later transmission | Processing A: Yes<br>Processing B: Yes | around 15:05 |
| ☐ | Current setting | Processing A: Yes<br>Processing B: No | around 15:00 |
| ☑ | Earlier transmission (1) | Processing A: Yes(1st page)<br>Processing B: No | around 14:55 |
| ☐ | Earlier transmission (2) | Processing A: No<br>Processing B: No | around 14:50 |

Will end around 14:55 according to this setting.

IMAGE PROCESSING APPARATUS WITH PREDICTIVE TIME DISPLAY AND INTERACTIVE CONFIGURATION

CROSS-REFERENCE TO RELATED APPLICATIONS

This application is based on and claims priority under 35 USC 119 from Japanese Patent Application No. 2022-041593 filed Mar. 16, 2022.

BACKGROUND

(i) Technical Field

The present disclosure relates to an image processing apparatus, a non-transitory computer readable medium, and an image processing method.

(ii) Related Art

Japanese Unexamined Patent Application Publication No. 2010-079611 describes technology enabling a user to easily know around when cooperative processing for executing multiple processing operations start and end.

SUMMARY

Although an operation for a setting has been performed for image processing, the setting is changed to another setting on occasions. In this case, the new setting for the image processing is decided in such a manner that a setting is selected from candidate settings such as character recognition and skew correction.

Note that a user sometimes does not comprehend that the change of the image processing setting to the new setting leads to a change of an image processing time. Some new changed settings are likely to cause the user to wait unexpectedly until the end of the image processing, and thus there is a room for improvement.

Aspects of non-limiting embodiments of the present disclosure relate to enabling a user to know an image processing time updated in response to the changing of an image processing setting.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: estimate, for image information to undergo image processing, a first time in performing the image processing on the image information in accordance with a current setting for the image processing; and present, to a user, the first time, a candidate setting changeable from the current setting, and a second time in performing the image processing on the image information in accordance with the candidate setting.

BRIEF DESCRIPTION OF THE DRAWINGS

An exemplary embodiment of the present disclosure will be described in detail based on the following figures, wherein.

DETAILED DESCRIPTION

Hereinafter, an image forming apparatus 20 taken as an example of an image processing apparatus according to this exemplary embodiment will be described.

Figure 1:
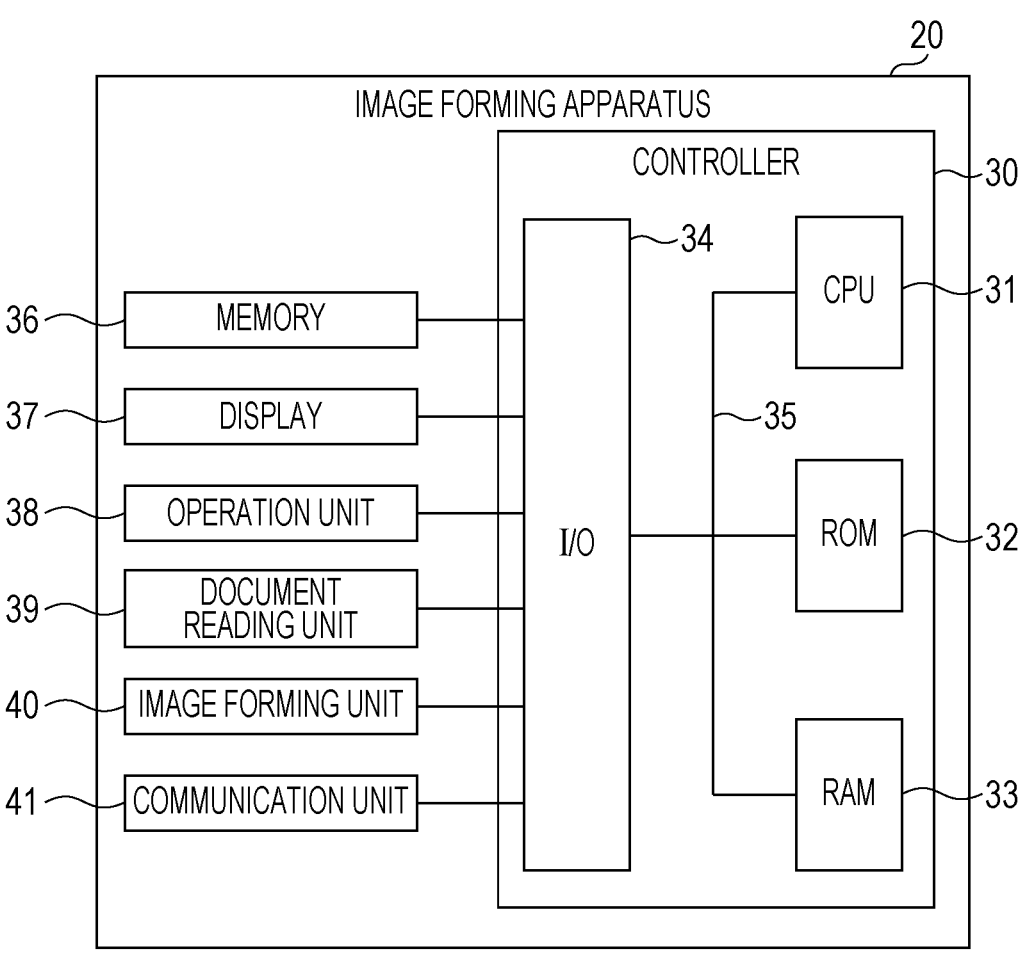
FIG. 1 is a block diagram illustrating the hardware configuration of an image forming apparatus.

FIG. 1 is a block diagram illustrating the hardware configuration of the image forming apparatus 20.

As illustrated in FIG. 1, the image forming apparatus 20 includes a controller 30 that controls the operation of the image forming apparatus 20. In the controller 30, a central processing unit (CPU) 31, a read only memory (ROM) 32, a random access memory (RAM) 33, and an input/output interface (I/O) 34 are connected to be able to communicate with each other with a bus 35 interposed therebetween.

The CPU 31 runs various programs and controls the components of the image forming apparatus 20. Specifically, the CPU 31 reads out a program from the ROM 32 or a memory 36 (described later) and runs the program by using the RAM 33 as a work area. The CPU 31 controls the components and performs various arithmetic operations in accordance with an appropriate one of the programs stored in the ROM 32 or the memory 36. The ROM 32 or the memory 36 stores an image processing program for executing at least a control process (described later). The image processing program may be installed in advance in the image forming apparatus 20 or may be appropriately installed in the image forming apparatus 20 in such a manner as to be stored in a nonvolatile storage medium or distributed via a network. Conceivable examples of the nonvolatile storage medium include a compact disk (CD)-ROM, a magneto-optical disk, a hard disk drive (HDD), a digital versatile disk (DVD)-ROM, a flash memory, and a memory card. The CPU 31 is an example of a processor.

The ROM 32 stores various programs and various pieces of data. The RAM 33 serves as the work area and temporarily stores a program or data.

To the I/O 34, the memory 36, a display 37, an operation unit 38, a document reading unit 39, an image forming unit 40, and a communication unit 41 are connected. These components are connected to the CPU 31 to be able to communicate with each other with the I/O 34 interposed therebetween.

The memory 36 is configured from a memory device such as a HDD, a solid state drive (SSD), or a flash memory and stores various programs and various pieces of data.

For the display 37, for example, a liquid crystal display or an organic electro luminescence (EL) display is used. The display 37 integrally has a touch panel.

The operation unit 38 is provided with various operation keys such as a numeric key pad and a start key.

The display 37 and the operation unit 38 receive various instructions from a user of the image forming apparatus 20. Examples of the various instructions include an instruction to start document reading and an instruction to start document copying. The display 37 displays various pieces of information such as a result of processing performed in accordance with an instruction received from the user and a notification regarding the processing.

The document reading unit 39, one by one, takes in sheets of a document placed on the document feeder tray of an auto document feeder (not illustrated) provided on the upper portion of the image forming apparatus 20, and optically reads the taken sheet of the document to acquire image information. Alternatively, the document reading unit 39 optically reads a document placed on a document glass such as platen glass to acquire image information.

The image forming unit 40 forms, on a recording medium such as paper sheet, an image acquired based on the image information acquired by the reading by the document reading unit 39 or acquired from an external personal computer (PC) or another apparatus connected via a network.

The communication unit 41 is an interface for performing communications with another apparatus. For example, a wired communication standard such as Ethernet (registered trademark) or Fiber Distributed Data Interface (FDDI) or a wireless communication standard such as 4G, 5G, or Wi-Fi (registered trademark) is used for the communications.

When running the image processing program described above, the image forming apparatus 20 performs processing based on the image processing program by using the hardware resources described above.

Figure 2:
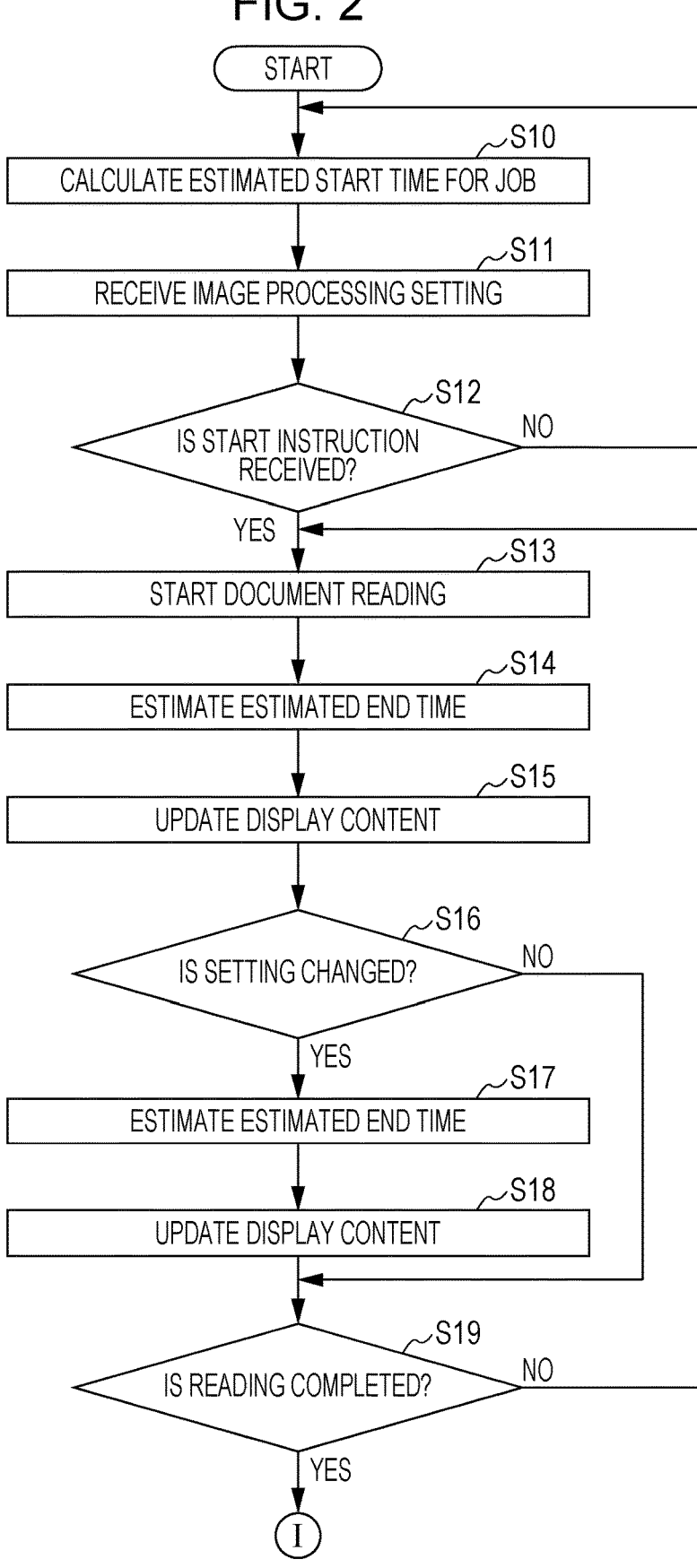
FIG. 2 is a first flowchart illustrating the flow of a control process executed by the image forming apparatus.
Figure 3:
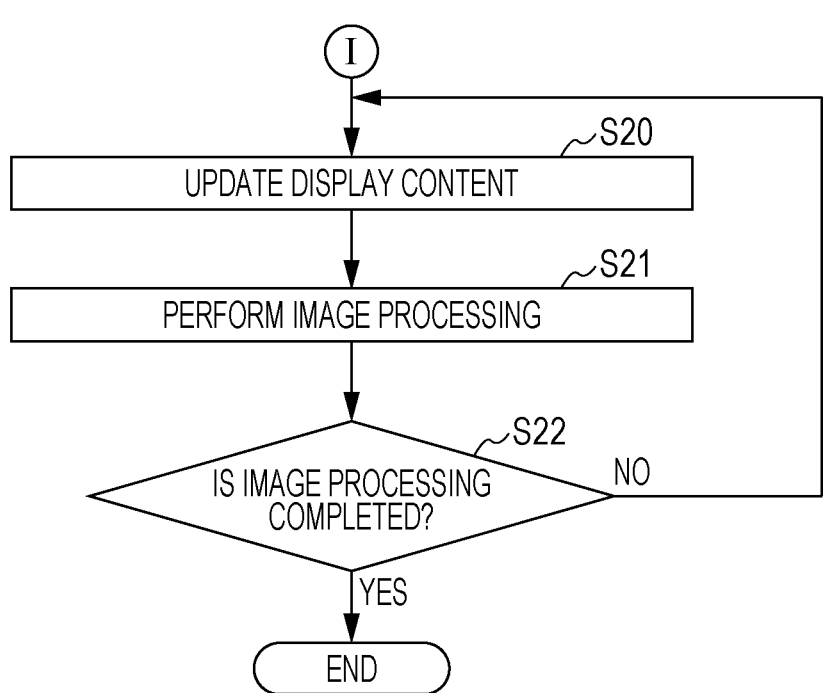
FIG. 3 is a second flowchart illustrating the flow of the control process executed by the image forming apparatus.

FIGS. 2 and 3 are flowcharts illustrating the flow of the control process for controlling the display content of the display 37, the control process being executed by the image forming apparatus 20. The control process is executed in such a manner that the CPU 31 reads out the image processing program from the ROM 32 or the memory 36, loads the program into the RAM 33, and then runs the program.

In step S10, the CPU 31 calculates an estimated start time for a job. In this exemplary embodiment, a job to be executed by the image forming apparatus 20 is a scan job for performing scan and transmission. For example, the estimated start time for the scan job is calculated by referring to an estimated end time for an active job in which the scan and transmission are being executed and a queued job that has been queued for execution of the scan and transmission. The process then proceeds to step S11.

In step S11, the CPU 31 receives a setting for the image processing (hereinafter, referred to as an image processing setting). For example, the CPU 31 receives an image processing setting set by the user. The image processing setting is received through the setting screen for setting an image processing setting. The process then proceeds to step S12. As the image processing setting, for example, character recognition (so-called optical character recognition (OCR)), skew correction, automatic appropriate orientation, whether to compress an image, or a resolution change is received.

In step S12, the CPU 31 determines whether an instruction to start document reading is received. If the CPU 31 determines that the instruction is received (YES in step S12), the process proceeds to step S13. In contrast, if the CPU 31 determines that the instruction to start document reading is not received (NO in step S12), the process returns to step S10. For example, if a predetermined operation for the scan and transmission is performed on the operation unit 38, the CPU 31 determines that an instruction to start document reading is received.

In step S13, the CPU 31 starts the document reading and acquires image information to undergo the image processing. In this exemplary embodiment, sheets of a document placed on the document feeder tray of the auto document feeder are read. The image information acquired by the CPU 31 is stored in the memory 36. The process then proceeds to step S14. In this exemplary embodiment, time when the document reading is started corresponds to time when the scan job is started.

In step S14, the CPU 31 estimates an estimated end time for the scan job for the image information regarding the document read in step S13. The estimated end time is estimated as time in performing the image processing in accordance with a current setting that is the image processing setting received in step S11. For example, the CPU 31 estimates the estimated end time for the scan job by using the start time of the scan job and an estimated processing time to be taken until the completion of the scan and transmission. The estimated processing time is estimated from the feature of an image included in the image information calculated by using a publicly known technology and acquired in step S13. The process then proceeds to step S15. The estimated end time in performing the image processing in accordance with the current setting is an example of a first time.

In step S15, the CPU 31 updates the display content of the display 37. A specific example of the display content will be described later. The CPU 31 here updates the estimated end time for the scan job displayed on the display 37. The process then proceeds to step S16.

In step S16, the CPU 31 determines whether the changing of the current setting is received. If the CPU 31 determines that the changing is received (YES in step S16), the process proceeds to step S17. In contrast, if the CPU 31 determines that the current setting is not received (NO in step S16), the process proceeds to step S19. For example, if a setting different from the current setting is selected on the reading screen (described later), the CPU 31 determines that the changing of the current setting is received.

In step S17, the CPU 31 estimates the estimated end time for the scan job. The estimated end time is estimated as time in performing the image processing on the image information regarding the document read in step S13, the image processing being performed in accordance with a candidate setting changeable from the current setting the changing of which is received in step S16. The process then proceeds to step S18. The estimated end time in performing the image processing in accordance with the candidate setting is an example of a second time.

In step S18, the CPU 31 updates the display content of the display 37. A specific example of the display content will be described later. The CPU 31 here updates the estimated end time for the scan job displayed on the display 37. The process then proceeds to step S19.

In step S19, the CPU 31 determines whether the reading of all of the sheets is completed. If the CPU 31 determines that the reading is completed (YES in step S19), the process proceeds to step S20 illustrated in FIG. 3. In contrast, if the CPU 31 determines that the reading of all of the sheets is not completed (NO in step S19), the process returns to step S13. For example, if a predetermined time has elapsed since the feeding of all of the sheets of the document placed on the document feeder tray of the auto document feeder is completed, the CPU 31 determines that the reading of all of the sheets is completed.

In step S20 illustrated in FIG. 3, the CPU 31 updates the display content of the display 37. Specific examples of the display content will be described later. If step S20 is performed the first time round, the CPU 31 displays, on the display 37, the estimated end time for the scan job estimated in the flowchart illustrated in FIG. 2. If step S20 is performed the second time round or later, the CPU 31 updates the estimated end time for the scan job displayed on the display 37. The process then proceeds to step S21.

In step S21, the CPU 31 performs the image processing on the image information regarding the document stored in the memory 36. Performing the image processing in step S21 causes the scan and transmission to a destination for the scan job. The process then proceeds to step S22.

In step S22, the CPU 31 determines whether the image processing of all of the sheets of the document is completed. If the CPU 31 determines that the image processing is completed (YES in step S22), the control process is terminated. In contrast, if the CPU 31 determines that the image processing of all of the sheets of the document is not completed (NO in step S22), the process returns to step S20.

Display examples based on the control process illustrated in FIGS. 2 and 3 will be described.

Figure 4:
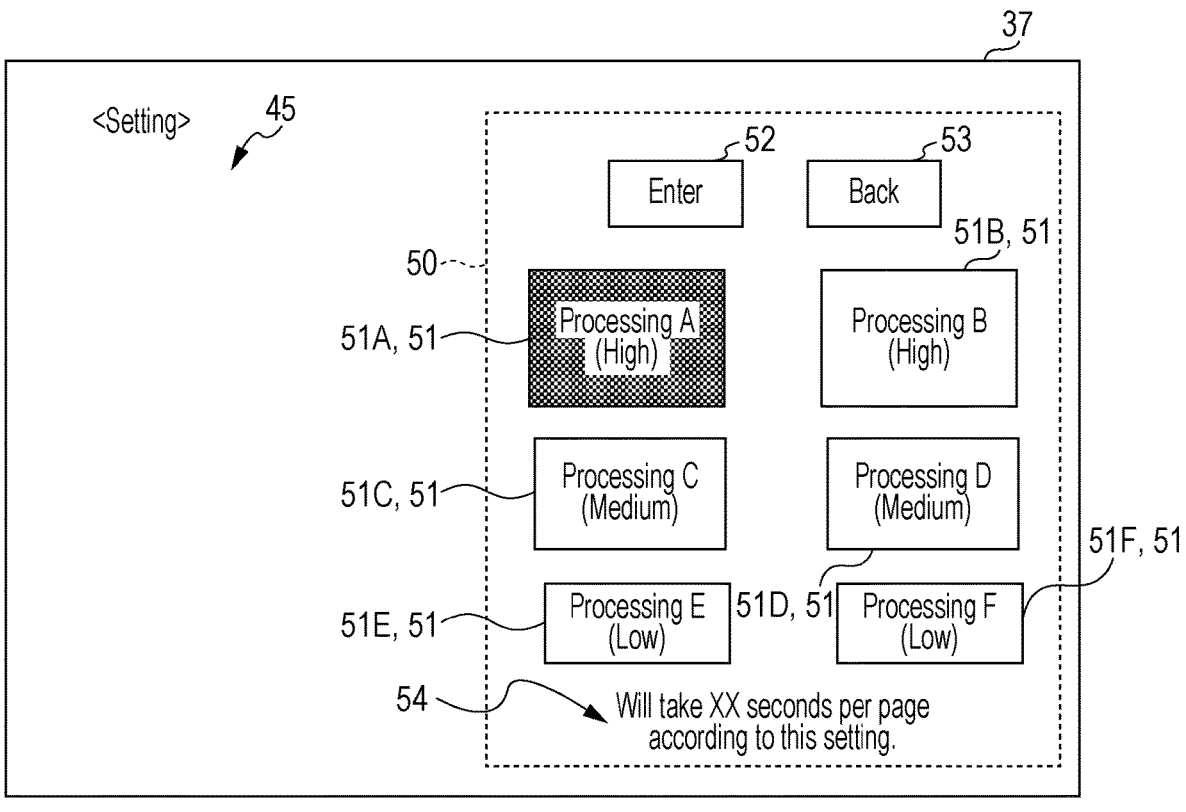
FIG. 4 illustrates a first display example displayed on the display of the image forming apparatus.

FIG. 4 illustrates a first display example displayed on the display 37 of the image forming apparatus 20. For example, if a predetermined operation is performed on the operation unit 38 for an image processing setting, the CPU 31 displays the setting screen illustrated in FIG. 4 on the display 37.

An information display part 45 and a setting display part 50 are displayed on the setting screen illustrated in FIG. 4.

The information display part 45 is a part for displaying information appropriate for one of the screens of the image forming apparatus 20. Although the illustration of information displayed in the information display part 45 is omitted in FIG. 4, information appropriate for the setting screen is displayed in the information display part 45.

The setting display part 50 is a part for displaying information for performing an image processing setting operation. For example, setting buttons 51, an Enter button 52, a Back button 53, and a message 54 are displayed in the setting display part 50.

Each setting button 51 represents a setting includable in image processing settings. For example, the setting buttons 51 include a setting button 51A representing a setting for processing A, a setting button 51B representing a setting for processing B, a setting button 51C representing a setting for processing C, a setting button 51D representing a setting for processing D, a setting button 51E representing a setting for processing E, and a setting button 51F representing a setting for processing F. FIG. 4 illustrates that a setting represented by the black setting button 51 of the setting buttons 51 is included in the image processing setting for which the predetermined operation has been performed and that settings represented by the white setting buttons 51 are not included in the image processing setting. That is, the setting screen illustrated in FIG. 4 depicts the inclusion of the setting represented by the setting button 51A in the image processing setting.

The CPU 31 displays, on the setting screen, a setting button 51 more highly effecting an earlier estimated end time included in the setting buttons 51 with priority over a setting button 51 less effecting an earlier estimated end time. In FIG. 4, in the displaying with priority, a setting button 51 more high effecting an earlier estimated end time is disposed in an upper portion of the display 37 and is made larger.

Further, the CPU 31 displays information indicating how earlier an estimated end time is to be made, in each setting button 51 on the setting screen. FIG. 4 illustrates, as the information, (High) in the setting buttons 51A and 51B, (Medium) in the setting buttons 51C and 51D, and (Low) in the setting buttons 51E and 51F.

The Enter button 52 is a button for establishing an image processing setting on the setting screen.

The Back button 53 is a button for restoring the image processing setting to a predetermined initial setting.

The message 54 represents various messages to the user. For example, FIG. 4 illustrates the message 54 "Will take XX seconds per page according to this setting". As described above, the message 54 illustrated in FIG. 4 indicates that performing the image processing in accordance with the image processing setting on the setting screen leads to an estimated processing time per page of XX seconds.

Figure 5:
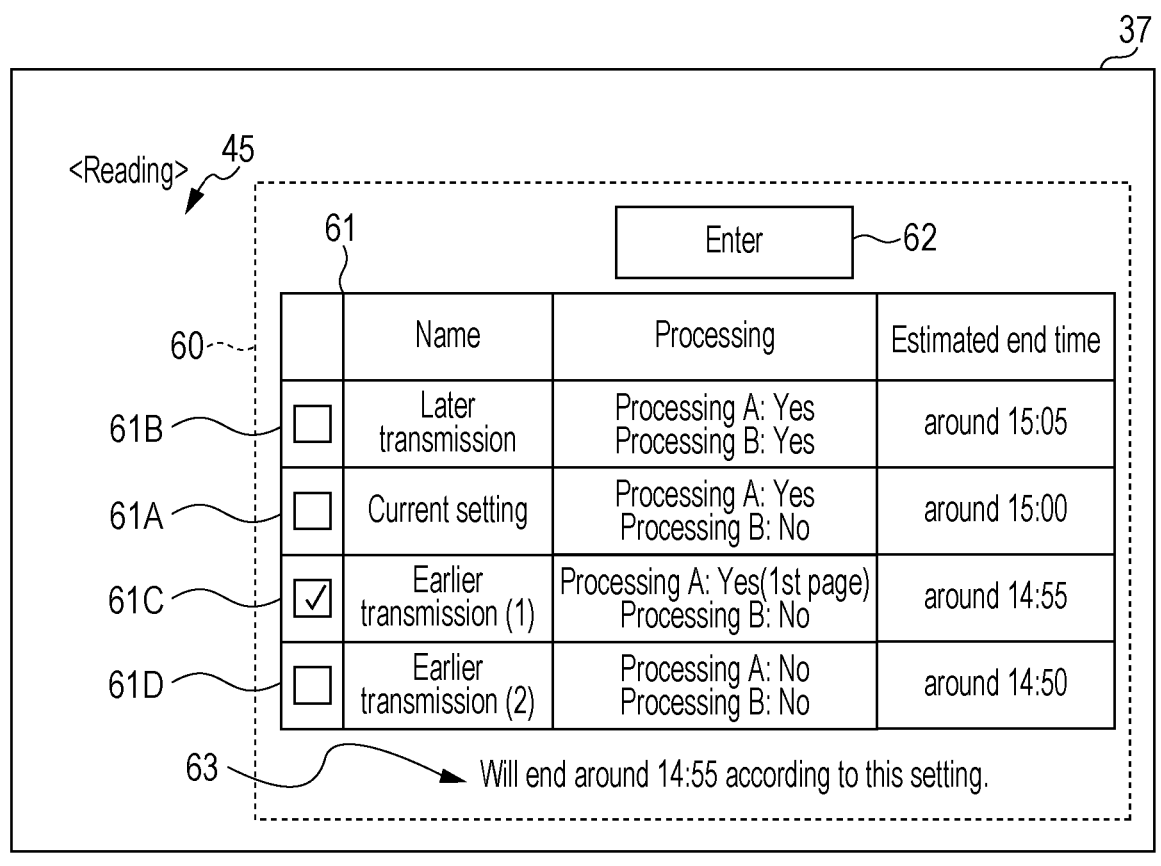
FIG. 5 illustrates a second display example displayed on the display of the image forming apparatus.

FIG. 5 illustrates a second display example displayed on the display 37 of the image forming apparatus 20. For example, if a predetermined operation for the scan and transmission is performed on the operation unit 38, the CPU 31 displays the reading screen illustrated in FIG. 5 on the display 37.

On the reading screen illustrated in FIG. 5, the information display part 45 and a setting changing part 60 are displayed. Although the illustration of information displayed in the information display part 45 is omitted in FIG. 5, information appropriate for the reading screen is displayed in the information display part 45.

The setting changing part 60 is a part for displaying information for changing an image processing setting. For example, setting information 61, an Enter button 62, and a message 63 are displayed in the setting changing part 60 illustrated in FIG. 5.

The setting information 61 indicates a current setting that has been set as an image processing setting on the setting screen and candidate settings changeable from the current setting, in a form of a table. The setting information 61 has a record 61A representing the current setting and a record 61B, a record 61C, and a record 61D that represent candidate settings. The setting information 61 also has checkboxes and items Name, Processing, and Estimated end time for each record described above.

Each checkbox is provided as a part for receiving the changing of an image processing setting made by the user. One checkbox is selectable in this exemplary embodiment. On the reading screen illustrated in FIG. 5, the checkbox for the record 61C is checked. The reading screen thus indicates that the image processing setting set on the setting screen is changed to the candidate setting represented by the record 61C.

The part for Name is provided for displaying the name of an image processing setting for each record.

The part for Processing is provided for displaying the content of the image processing setting in the record. Whether the processing A and the processing B are applied to the image processing is displayed in Processing in FIG. 5, but whether another processing such as the processing C or the processing D is applied may also be displayed in addition to this.

The part for Estimated end time is provided for displaying an estimated end time in performing the image processing in accordance with the image processing setting in the record.

In FIG. 5, the records 61C, 61D, and 61B are displayed as candidate settings. The records 61C and 61D serve as candidate settings (hereinafter, referred to as earlier-time candidate settings) leading to an earlier estimated end time than the estimated end time in performing the image processing in accordance with the current setting. The record 61B serves as a candidate setting (later-time candidate setting) leading to a later estimated end time. In addition, the records are arranged in reverse chronological order of the estimated end time from an upper portion to a lower portion of the display 37 in FIG. 5. Specifically, in FIG. 5, the record 61B, the record 61A, the record 61C, and the record 61D are arranged in this order from the upper portion to the lower portion of the display 37.

The Enter button 62 is a button for establishing the changing of an image processing setting on the reading screen.

The message 63 represents various messages to the user. For example, FIG. 5 illustrates "Will end around 14:55 according to this setting". As described above, the message 63 illustrated in FIG. 5 indicates that image processing to be performed in accordance with the candidate setting represented in the record 61C will end around 14:55.

If there is a change in the record with the checked checkbox on the reading screen illustrated in FIG. 5, the estimated end time displayed in the message 63 is changed in accordance with the change. Specifically, in this case, the estimated end time for the image processing setting in the checked record is displayed as the message 63. Further, every time one of the sheets of the document is read, the estimated end times displayed in the setting information 61 and the message 63 are changed on the reading screen. Specifically, in this case, every time a sheet of the document is read, new estimated end times each obtained by adding the corresponding estimated processing time per read sheet to the latest estimated end time is displayed as the setting information 61 and the message 63.

The display example of the reading screen is not limited to the example illustrated in FIG. 5 and may be, for example, as follows. The same explanation as the explanation given with reference to FIG. 5 is omitted.

Figure 6:
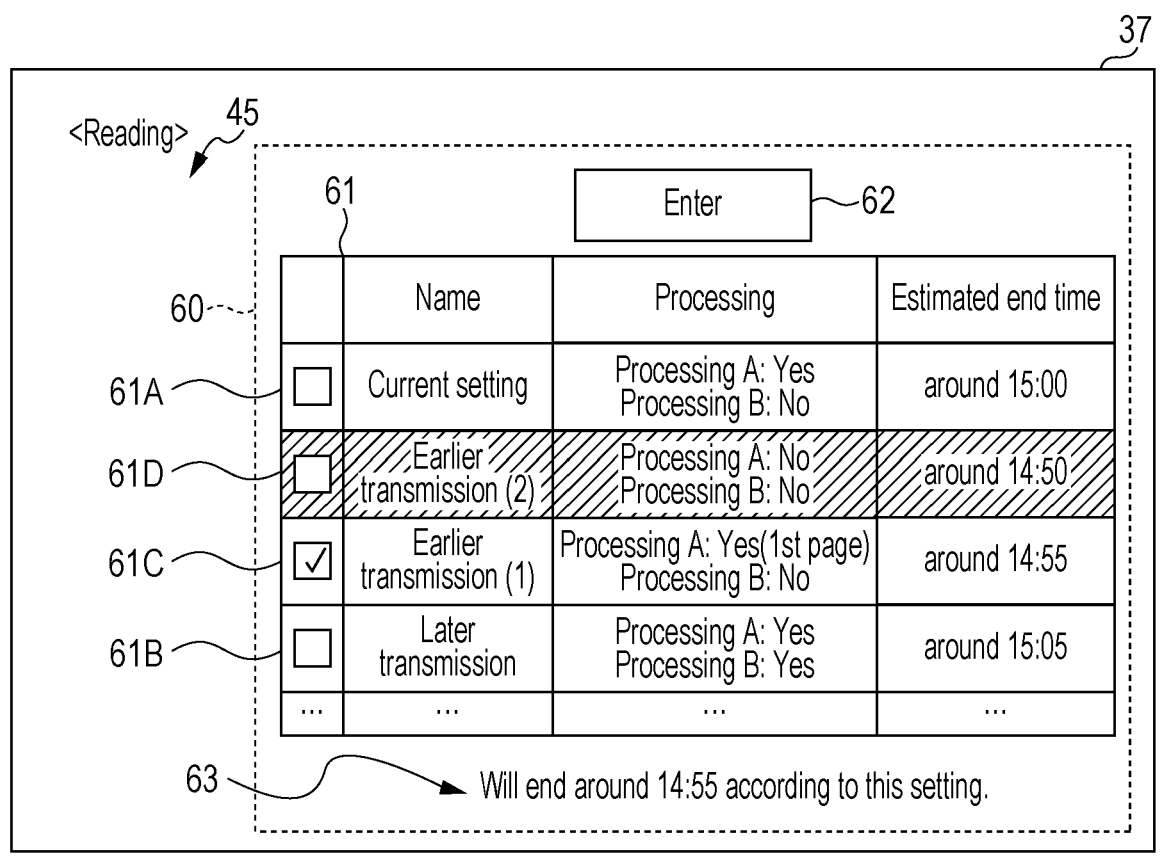
FIG. 6 illustrates a third display example displayed on the display of the image forming apparatus.

FIG. 6 illustrates a third display example displayed on the display 37 of the image forming apparatus 20.

The information display part 45 and the setting changing part 60 are displayed on the reading screen illustrated in FIG. 6. The setting information 61, the Enter button 62, and the message 63 are displayed in the setting changing part 60.

The setting information 61 illustrated in FIG. 6 has a larger number of records than those in FIG. 5, and thus all of the records are not displayed within the reading screen. In this case, for example, in response to scrolling, page changing, or another operation, the records displayed on the reading screen are changed.

In FIG. 6, a candidate setting leading to the earliest estimated end time in performing the image processing (earliest-time candidate setting) is displayed with priority among the candidate settings. In FIG. 6, in the displaying with priority, the record 61D representing the earliest-time candidate setting is displayed below and next to the record 61A representing the current setting. Accordingly, in FIG. 6, the record 61A, the record 61D, the record 61C, and the record 61B are displayed in this order from the upper portion to the lower portion of the display 37. In this arrangement, the record 61A representing the current setting is disposed in the top row, and the record 61B, the record 61C, and the record 61D representing the candidate settings are disposed below the record 61A in chronological order of the estimated end time.

Further, in FIG. 6, in the displaying with priority, the record 61D representing the earliest-time candidate setting is displayed in a different form from that for the records 61B and 61C. The different form is expressed as hatching in FIG. 6 but may be expressed by differentiating the color, the character size, or the like, instead of or in addition to this.

Figure 7:
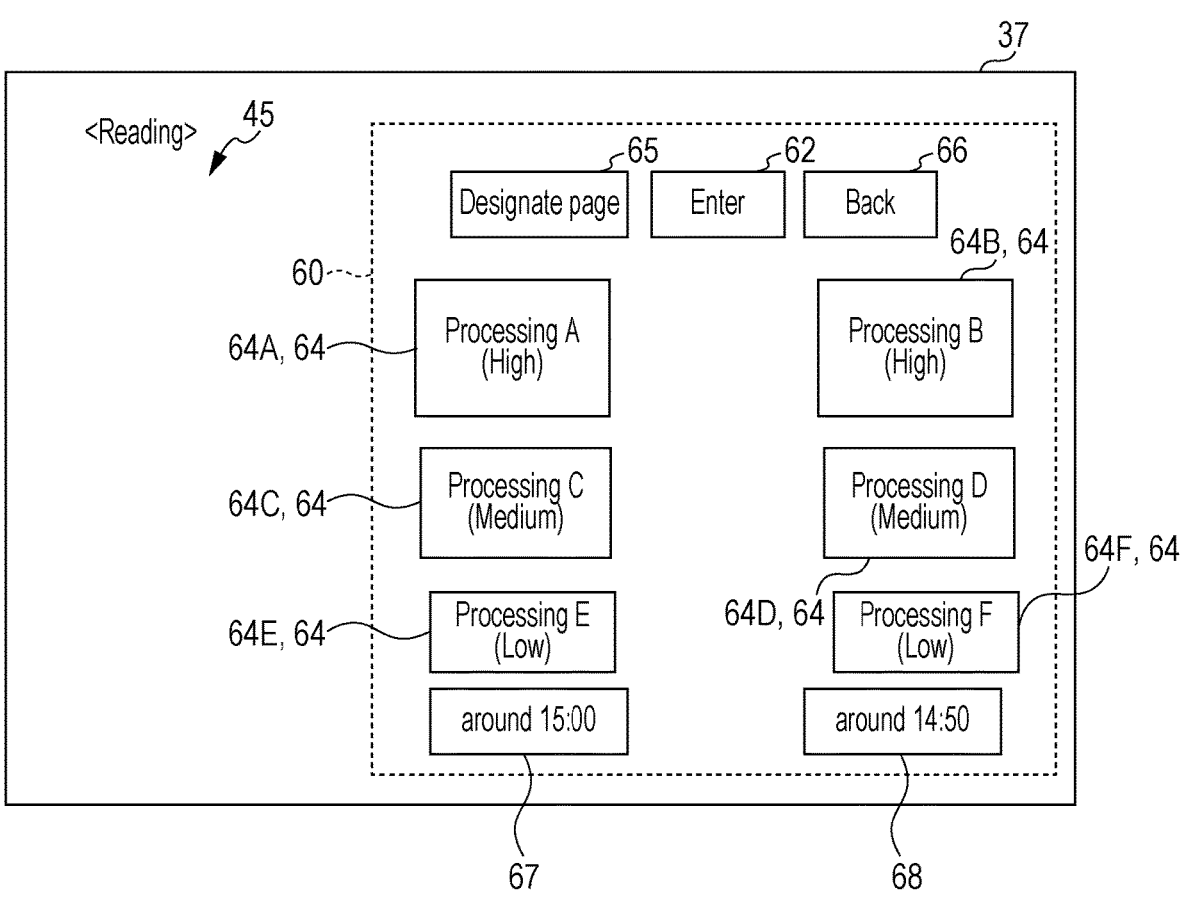
FIG. 7 illustrates a fourth display example displayed on the display of the image forming apparatus.

FIG. 7 illustrates a fourth display example displayed on the display 37 of the image forming apparatus 20.

The information display part 45 and the setting changing part 60 are displayed on the reading screen illustrated in FIG. 7. For example, the Enter button 62, setting buttons 64, a page designation button 65, a Back button 66, a pre-change time 67, and a post-change time 68 are displayed in the setting changing part 60.

Each setting button 64 is a button representing a candidate setting changeable from the current setting. For example, the setting buttons 64 include a setting button 64A representing a candidate setting for processing A, a setting button 64B representing a candidate setting for processing B, a setting button 64C representing a candidate setting for processing C, a setting button 64D representing a candidate setting for processing D, a setting button 64E representing a candidate setting for processing E, and a setting button 64F representing a candidate setting for processing F. FIG. 7 illustrates that candidate settings represented by the white setting buttons 64 of the setting buttons 64 have not been included in the image processing setting. That is, the reading screen illustrated in FIG. 7 depicts the exclusion of the candidate settings represented by the setting buttons 64 from the image processing setting. The reading screen is also displayed to receive the selection of application or non-application of any of the setting buttons 64 to the image processing by the user, and a setting button 64 selected for application is displayed in such a manner as to be filled with black.

The CPU 31 also displays, on the reading screen, the setting button 64 more highly effecting an earlier estimated end time included in the setting buttons 64 with priority over the setting button 64 less effecting an earlier estimated end time. In FIG. 7, in the displaying with priority, a setting button 64 more highly effecting an earlier estimated end time is disposed in an upper portion of the display 37 and is made larger. The displaying with priority is not limited to the above, and the setting button 64 more highly effecting an earlier estimated end time may be expressed by changing a color, instead of or in addition to this.

Further, the CPU 31 displays information indicating how earlier an estimated end time is to be made, on the reading screen for each setting button 64. FIG. 7 illustrates, as the information, (High) in the setting buttons 64A and 64B, (Medium) in the setting buttons 64C and 64D, and (Low) in the setting buttons 64E and 64F. The content of the characters displayed as the information is not limited to the above, and the information may be indicated by displaying a symbol, instead of or in addition to the characters.

The page designation button 65 is a button for designating a page of image information for performing the image processing in accordance with an image processing setting after the change (post-change image processing setting). In response to the operation of the page designation button 65, the CPU 31 displays, on the display 37, a screen (not illustrated) for designating the page of the image information and receives page designation by the user on the screen. The page of the image information is an example of a range of image information.

The Back button 66 is a button for restoring the post-change image processing setting to the image processing setting set on the setting screen.

The pre-change time 67 represents an estimated end time in performing the image processing in accordance with the image processing setting set on the setting screen. For example, FIG. 7 illustrates "around 15:00" displayed as the pre-change time 67.

The post-change time 68 represents an estimated end time in performing the image processing in accordance with the post-change image processing setting. For example, FIG. 7 illustrates "around 14:50" displayed as the post-change time 68.

If the application or non-application of the setting button 64 is changed on the reading screen illustrated in FIG. 7, the estimated end time displayed in the post-change time 68 is changed. Specifically, in this case, as the setting buttons 64 selected for application are increased, the estimated end time displayed as the post-change time 68 becomes later. As the setting buttons 64 selected for application are decreased, the estimated end time displayed as the post-change time 68 becomes earlier. In addition, every time a sheet of the document is read, the estimated end times displayed as the pre-change time 67 and the post-change time 68 are changed on the reading screen. Specifically, in this case, every time a sheet of the document is read, new estimated end times are respectively displayed as the pre-change time 67 and the post-change time 68. Each new estimated end time is obtained by adding an estimated processing time per read sheet to the latest estimated end time.

A display example after the Enter button 62 is operated on the reading screen illustrated in any of FIGS. 5 to 7 will be described.

Figure 8:
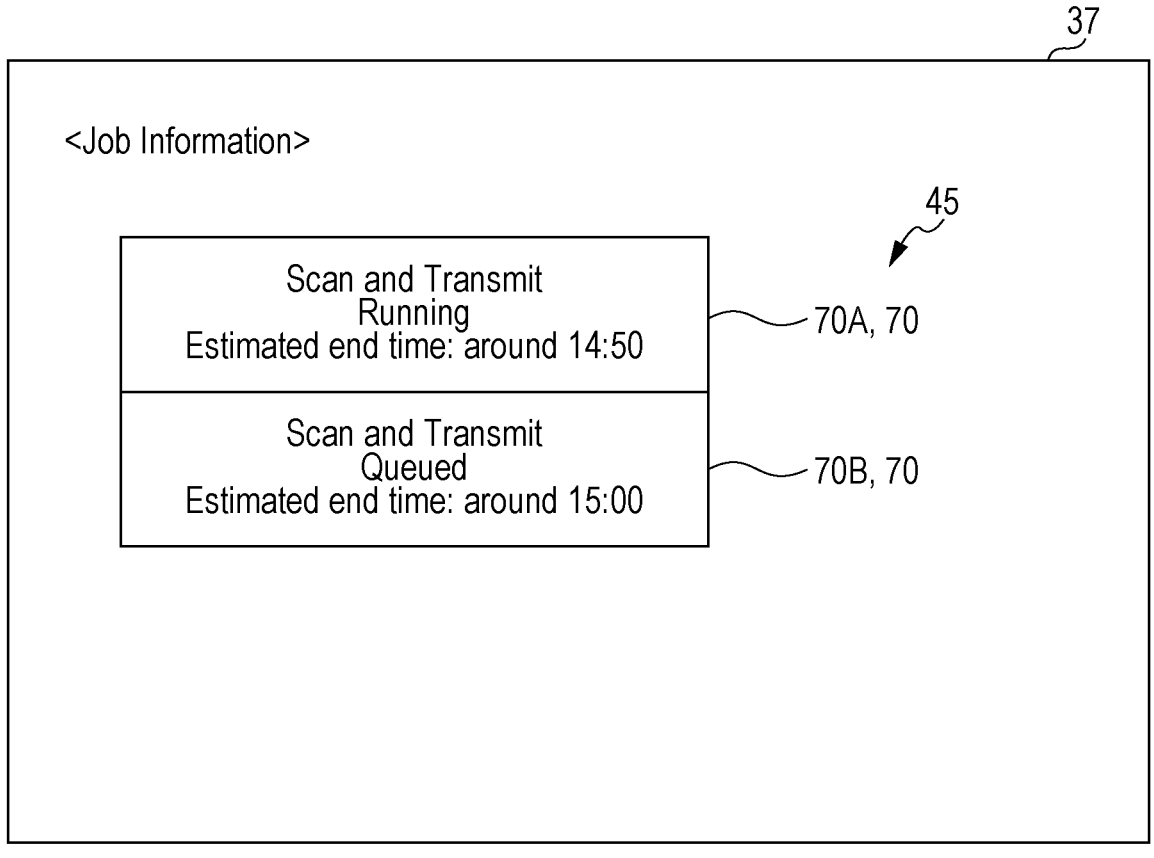
FIG. 8 illustrates a fifth display example displayed on the display of the image forming apparatus.

FIG. 8 illustrates a fifth display example displayed on the display 37 of the image forming apparatus 20. For example, if the Enter button 62 is operated on the reading screen illustrated in any of FIGS. 5 to 7, the CPU 31 displays a job information screen illustrated in FIG. 8 on the display 37.

On the job information screen illustrated in FIG. 8, the information display part 45 and a job display part 70 are displayed. Although the illustration of information displayed in the information display part 45 is omitted in FIG. 8, information appropriate for the job information screen is displayed in the information display part 45.

The job display part 70 is a part for displaying overview information regarding a job execution of which is received. For example, a job display part 70A and a job display part 70B are displayed in the job display part 70.

The job display part 70A has the overview information "Scan and transmission; Running; and Estimated end time: around 14:50" displayed therein. As described above, the job display part 70A indicates that the job is a scan job for scan and transmission, the scan job is being executed, and the estimated end time for the scan job is around 14:50.

The job display part 70B has the overview information "Scan and Transmission; Queued; and Estimated end time: around 15:00" displayed therein. As described above, the job display part 70B indicates that the job is a scan job for scan and transmission, the scan job is queued, and the estimated end time for the scan job is around 15:00.

The job display parts 70A and 70B also function as buttons for displaying detail information regarding a job. After the job display part 70A or 70B is operated, the CPU 31 displays a job detail screen indicating the detail information on the display 37.

Figure 9:
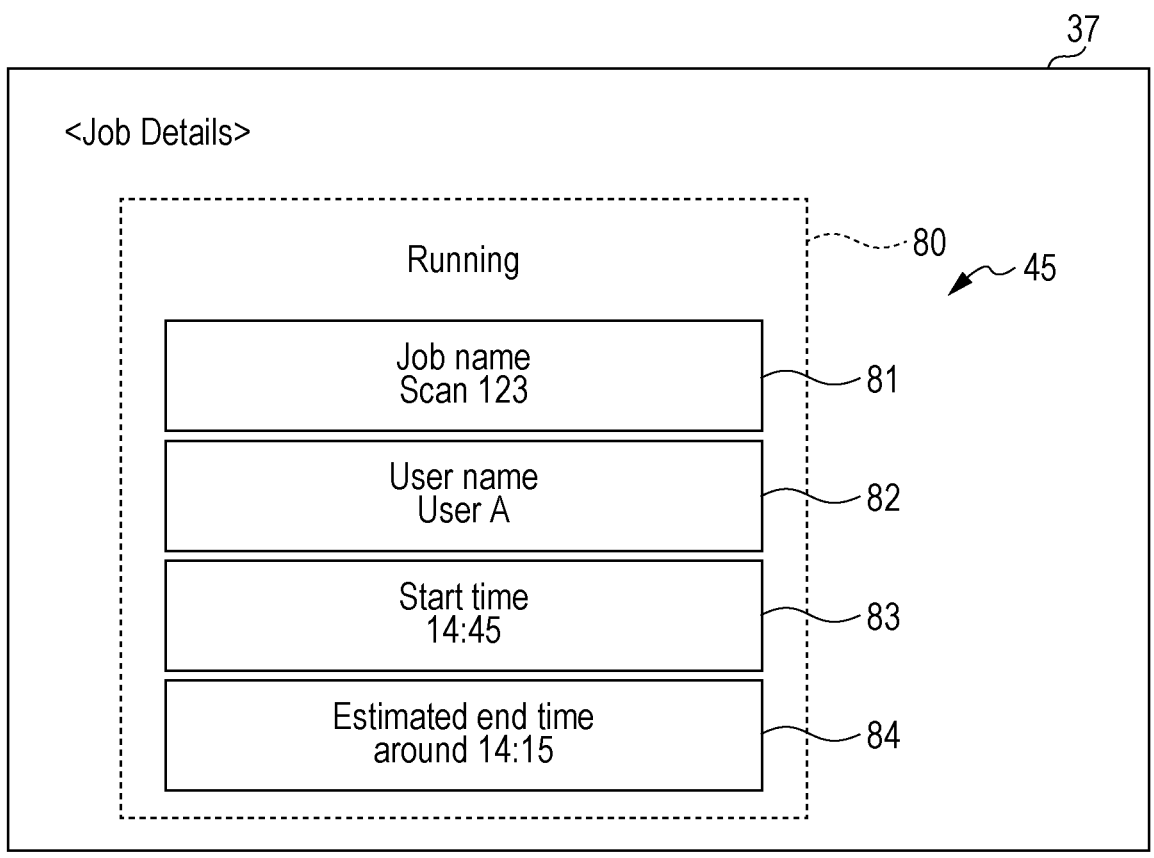
FIG. 9 illustrates a sixth display example displayed on the display of the image forming apparatus.

FIG. 9 illustrates a sixth display example displayed on the display 37 of the image forming apparatus 20. For example, if the job display part 70A is operated on the job information screen illustrated in FIG. 8, the CPU 31 displays the job detail screen illustrated in FIG. 9 on the display 37.

The information display part 45 and a job display part 80 are displayed on the job detail screen illustrated in FIG. 9. Although the illustration of information displayed in the information display part 45 is omitted in FIG. 9, information appropriate for the job detail screen is displayed in the information display part 45.

The job display part 80 is a part for displaying the detail information regarding the job corresponding to the job display part 70 operated on the job information screen illustrated in FIG. 8. For example, the job display part 80 includes a job-name display part 81, a user-name display part 82, a start-time display part 83, and an estimated-end-time display part 84.

The job-name display part 81 is a part for displaying a job name that is the name of a job. For example, FIG. 9 illustrates "Job name; and Scan 123" in the job-name display part 81.

The user-name display part 82 is a part for displaying a user name that is the name of a user who gives an instruction to execute the job. For example, FIG. 9 illustrates "User name; and User A" displayed in the user-name display part 82.

The start-time display part 83 is a part for displaying a start time when the execution of the job is started. For example, FIG. 9 illustrates "Start time; and 14:45" displayed in the start-time display part 83.

The estimated-end-time display part 84 is a part for displaying an estimated end time for the job. For example, FIG. 9 illustrates "Estimated end time; and around 14:50" displayed in the estimated-end-time display part 84.

The estimated end time in performing the image processing in accordance with the image processing setting set on the reading screen is displayed in the job display part 70 of the job information screen and the job display part 80 of the job detail screen. Thereafter, every time image information regarding one of the sheets of the read document is transmitted after the scan page by page, the displayed estimated end time is changed in the job display part 70 and the job display part 80. Specifically, in this case, every time the image information is transmitted after the scan page by page, the new estimated end time is displayed in the job display part 70 and the job display part 80. The new estimated end time is obtained by adding a difference between a processing time per page and an estimated processing time per read sheet to the estimated end time.

In the image forming apparatus 20, a document having multiple sheets is read by using the auto document feeder, and thereafter image processing of image information regarding the document is performed. There thus arises a time lag between the departure of the document from the hand of the user and the completion of the scan and transmission. In the image forming apparatus 20, even an advance image processing setting is changed to another image processing setting on occasions. In this case, the new setting for the image processing is decided in such a manner that a setting is selected from candidate settings such as character recognition and skew correction.

Note that the user sometimes does not comprehend that, for example, the change of the image processing setting to the new setting leads to a change of an estimated end time. Some new changed image processing settings are likely to cause the user to wait unexpectedly until the completion of the scan and transmission, and thus there is a room for improvement.

Hence, the CPU 31 of the image forming apparatus 20 estimates, for the image information to undergo the image processing, an estimated end time in performing the image processing in accordance with the current setting. The CPU 31 then presents, to the user, the estimated end time, candidate settings changeable from the current setting, and an estimated end time in performing the image processing on the image information in accordance with one of the candidate settings (see FIGS. 5, 6, and 7). With the image forming apparatus 20, the user may know an estimated end time to be updated in response to the changing of the image processing setting.

The CPU 31 of the image forming apparatus 20 also presents an earlier-time candidate setting and a later-time candidate setting to the user. The earlier-time candidate setting leads to an earlier estimated end time than an estimated end time in performing the image processing in accordance with the current setting, and the later-time candidate setting leads to a later estimated end time than an estimated end time in performing the image processing in accordance with the current setting (see FIGS. 5 and 6). With the image forming apparatus 20, the user may thus know estimated end times made earlier and later in response to the changing of the image processing setting.

If there are multiple earlier-time candidate settings, the CPU 31 of the image forming apparatus 20 presents, to the user, the earliest-time candidate setting with priority (see FIG. 6). With the image forming apparatus 20, the earliest-time candidate setting may thus draw more attention from the user than in presenting the candidate settings in a common form.

The CPU 31 of the image forming apparatus 20 also displays the earliest-time candidate setting next to the current setting (see FIG. 6). With the image forming apparatus 20, the user's line of sight thus moves a shorter distance from the current setting to the earliest-time candidate setting than in a case where the earliest-time candidate setting is not disposed next to the current setting.

The CPU 31 of the image forming apparatus 20 also presents different settable candidate settings to the user. The CPU 31 receives selection of application or non-application of a candidate setting to the image processing by the user for each candidate setting (see FIG. 7). With the image forming apparatus 20, the user may thus know an estimated end time for the candidate setting selected by the user.

The CPU 31 of the image forming apparatus 20 also presents, to the user, a candidate setting more highly effecting an earlier estimated end time included in the candidate settings with priority over a candidate setting less effecting an earlier estimated end time (see FIG. 7). With the image forming apparatus 20, the candidate setting more highly effecting an earlier estimated end time may thus draw more attention from the user than in presenting the candidate settings in the common form.

The CPU 31 of the image forming apparatus 20 also displays information indicating how earlier an estimated end time is to be made, for each candidate setting (see FIG. 7). With the image forming apparatus 20, the user may thus know how earlier an estimated end time is to be made for each candidate setting.

The CPU 31 of the image forming apparatus 20 also receives the changing of the current setting in a period from the start to the end of the image information. With the image forming apparatus 20, the estimated end time may thus be controlled during the reading of the image information.

The CPU 31 of the image forming apparatus 20 also designates a page of the image information to undergo the image processing to be performed in accordance with the candidate setting. With the image forming apparatus 20, the estimated end time for the designated page of the image information may thus be controlled.

Others

A relationship between a file size and an image processing time will be described by using FIG. 10.

Figure 10:
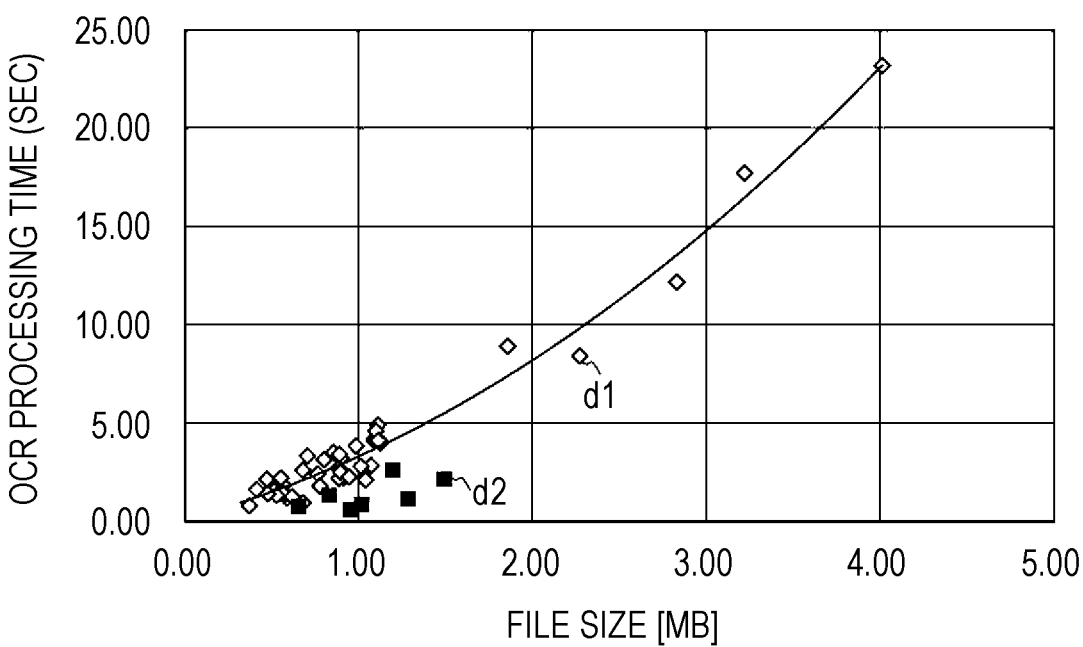
FIG. 10 is graph for explaining a relationship between a file size and an image processing time.

FIG. 10 is a graph for explaining a relationship between a file size and an image processing time. In FIG. 10, the image processing time is, for example, an OCR processing time. In FIG. 10, the vertical axis represents an OCR processing time (seconds), and the horizontal axis represents the file size (MB) of a document. In FIG. 10, data d1 expressed by a diamond represents data having a correlation between a file size and an OCR processing time, and data d2 expressed by a black square represents data having no correlation between a file size and an OCR processing time.

As illustrated in FIG. 10, as the file size becomes larger, the OCR processing time tends to become longer.

In a case where the image information of the read document has a feature of no correlation between a file size and an OCR processing time, the CPU 31 of the image forming apparatus 20 may perform pre-processing on the image information and thereafter perform the image processing. Examples of the feature include at least partial inclusion of a photo in the document, a background fog on the document, and at least partial inclusion of a table in the document. In this case, for example, the CPU 31 removes the background fog of the image information in the pre-processing and thereafter performs the image processing on the image information. With the image forming apparatus 20, the correlation between a file size and an OCR processing time may thus be improved, and an error between an estimated end time and the actual end time may be reduced as compared with the case where the image processing is performed without the pre-processing.

In the exemplary embodiment above, the current setting is an image processing setting set on the setting screen (see FIG. 4) but is not limited to this. The current setting may be the initial setting for a predetermined image processing setting, without providing the setting screen.

In the exemplary embodiment above, the earlier-time candidate settings and the later-time candidate setting are presented to the user (see FIGS. 5 and 6). However, the presented candidate settings are not limited to these. One of the later-time candidate setting and each earlier-time candidate setting may be presented to the user.

In the exemplary embodiment above, the record 61D representing the earliest-time candidate setting is displayed below and next to the record 61A representing the current setting (see FIG. 6). However, the adjoining direction is not limited to the downward direction. The earliest-time candidate setting may be displayed above, on the left side of, or on the right side of the current setting and next thereto.

In the exemplary embodiment above, a page of the image information is an example of a range of image information, but the range of the image information is not limited to the page. An area of a page of the image information may be designated as the range of the image information.

In the exemplary embodiment above, an estimated end time in performing the image processing in accordance with the current setting is an example of the first time. However, the first time is not limited to this. An estimated processing time taken to complete the image processing in accordance with the current setting may be an example of the first time.

In the exemplary embodiment above, an estimated end time in performing the image processing in accordance with a candidate setting is an example of the second time. However, the second time is not limited to this. An estimated processing time taken to complete the image processing in accordance with the candidate setting may be an example of the second time.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
estimate, a first time in performing an image processing on an image information in accordance with a current setting for the image processing, the estimated first time includes a start time and a first end time of performing the image processing in accordance with the current setting;
present, to a user, the first time, a candidate setting changeable from the current setting, and a second time in performing the image processing on the image information in accordance with the candidate setting;
receive a user-entered candidate setting;
estimate the second time for completing the image processing using the user-entered candidate setting, wherein the second time includes a second end time that is based on the start time of the estimated first time;
update a display content for the estimated second time;
determine a reading completion;
in response to the determined reading completion:
update the display content of the estimated second time, and
perform image processing of scan and transmission to a destination of a scan job; and
wherein the processor is further configured to: start reading of a document in response to receiving of an instruction to start document reading, wherein the time when the document reading is started corresponds to the start time of the image processing, and the started document reading acquires the image information to undergo the image processing.

2. The image processing apparatus according to claim 1, wherein the processor is configured to:

present at least one of an earlier-time candidate setting or a later-time candidate setting to the user among a plurality of the candidate settings, the earlier-time candidate setting leading to the second time earlier than the first time among a plurality of the second times, the later-time candidate setting leading the second time later than the first time among the plurality of second times.

3. The image processing apparatus according to claim 2, wherein the processor is configured to:
in response to a plurality of the earlier-time candidate settings, present an earliest-time candidate setting included in the earlier-time candidate settings to the user with priority, the earliest-time candidate setting leading to the second time that is earliest of the second times.

4. The image processing apparatus according to claim 3, wherein the processor is configured to:
display the earliest-time candidate setting next to the current setting.

5. The image processing apparatus according to claim 4, wherein the processor is configured to:
receive changing of the current setting in a period from a start to an end of reading the image information.

6. The image processing apparatus according to claim 3, wherein the processor is configured to:
receive changing of the current setting in a period from a start to an end of reading the image information.

7. The image processing apparatus according to claim 2, wherein the processor is configured to:
receive changing of the current setting in a period from a start to an end of reading the image information.

8. The image processing apparatus according to claim 2, wherein the processor is configured to:
designate a range of the image information to undergo the image processing to be performed in accordance with the candidate setting.

9. The image processing apparatus according to claim 1, wherein the processor is configured to:
present, to the user, a plurality of the candidate settings for respective different settable image processing operations; and
receive selection of application or non-application of one of the candidate settings to the image processing, the selection being made by the user and received for each of the candidate settings.

10. The image processing apparatus according to claim 9, wherein the processor is configured to:
present the candidate setting more highly effecting reduced time for the image processing among the plurality of candidate settings to the user with priority over the candidate setting less effecting the reduced time.

11. The image processing apparatus according to claim 10, wherein the processor is configured to:
display information indicating how much time for the image processing is to be reduced, the information being displayed for each candidate setting.

12. The image processing apparatus according to claim 11, wherein the processor is configured to:
receive changing of the current setting in a period from a start to an end of reading the image information.

13. The image processing apparatus according to claim 10, wherein the processor is configured to:

receive changing of the current setting in a period from a start to an end of reading the image information.

14. The image processing apparatus according to claim 9, wherein the processor is configured to:

display information indicating how much time for the image processing is to be reduced, the information being displayed for each candidate setting.

15. The image processing apparatus according to claim 14, wherein the processor is configured to:

receive changing of the current setting in a period from a start to an end of reading the image information.

16. The image processing apparatus according to claim 9, wherein the processor is configured to:

receive changing of the current setting in a period from a start to an end of reading the image information.

17. The image processing apparatus according to claim 1, wherein the processor is configured to:

receive changing of the current setting in a period from a start to an end of reading the image information.

18. The image processing apparatus according to claim 1, wherein the processor is configured to:

designate a range of the image information to undergo the image processing to be performed in accordance with the candidate setting.

19. The image processing apparatus according to claim 1, wherein the image processing is selected from at least one of character recognition, skew correction, image compression, and resolution change.

20. A non-transitory computer readable medium storing a program for causing a computer to execute a process for image processing, the process comprising:

estimating, a first time in performing an image processing on an image information in accordance with a current setting for the image processing, the estimated first time includes a start time and a first end time of performing the image processing in accordance with the current setting;

presenting, to a user, the first time, a candidate setting changeable from the current setting, and a second time in performing the image processing on the image information in accordance with the candidate setting;

receiving a user-entered candidate setting;

estimating the second time for completing the image processing using the user-entered candidate setting, wherein the second time includes a second end time that is based on the start time of the estimated first time;

updating a display content for the estimated second time;

determining a reading completion;

in response to the determined reading completion:

updating the display content of the estimated second time, and performing image processing of scan and transmission to a destination of a scan job; and wherein the processor is further configured to: start reading of a document in response to receiving of an instruction to start document reading, wherein the time when the document reading is started corresponds to the start time of the image processing, and the started document reading acquires the image information to undergo the image processing.

21. An image processing method comprising:

estimating, a first time in performing an image processing on an image information in accordance with a current setting for the image processing, the estimated first time includes a start time and a first end time of performing the image processing in accordance with the current setting;

presenting, to a user, the first time, a candidate setting changeable from the current setting, and a second time in performing the image processing on the image information in accordance with the candidate setting;

receiving a user-entered candidate setting;

estimating the second time for completing the image processing using the user-entered candidate setting, wherein the second time includes a second end time that is based on the start time of the estimated first time;

updating a display content for the estimated second time;

determining a reading completion;

in response to the determined reading completion:

updating the display content of the estimated second time, and performing image processing of scan and transmission to a destination of a scan job; and wherein the processor is further configured to: start reading of a document in response to receiving of an instruction to start document reading, wherein the time when the document reading is started corresponds to the start time of the image processing, and the started document reading acquires the image information to undergo the image processing.

* * * * *